Figure 1:
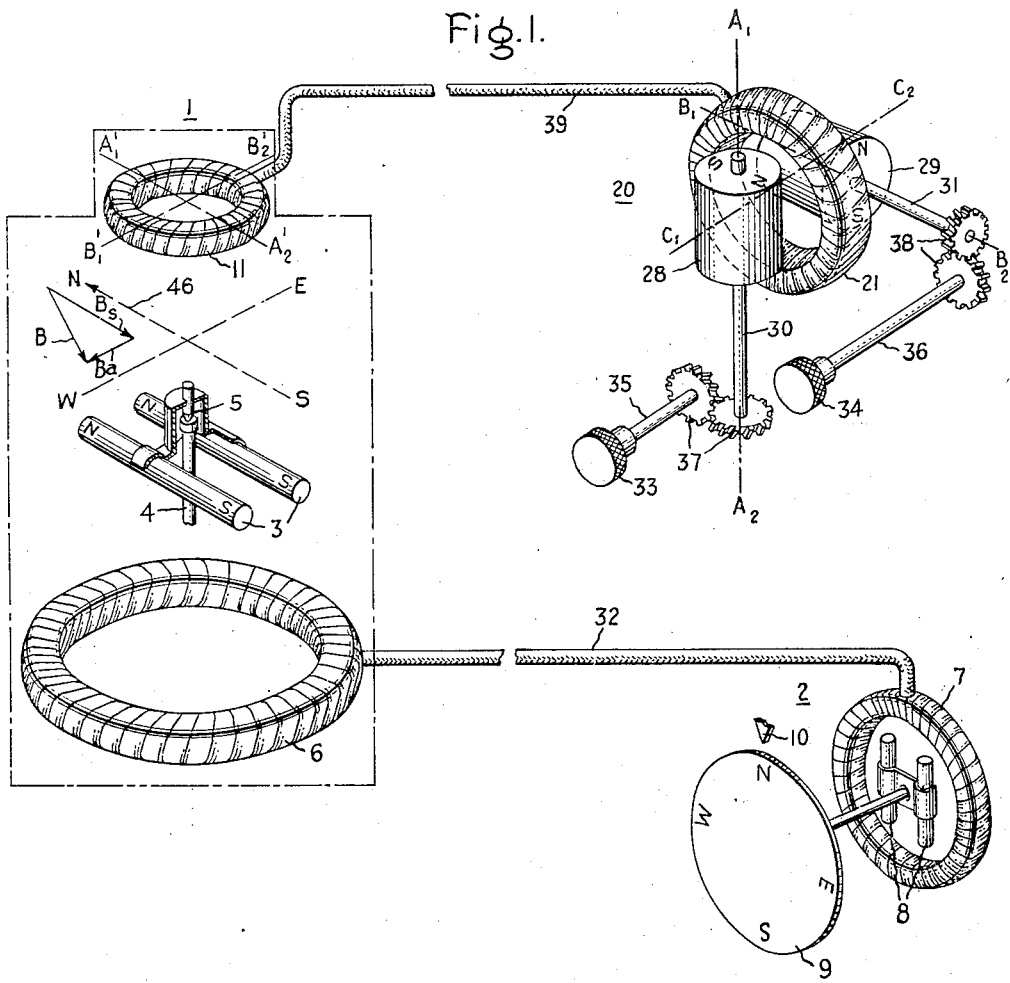

July 30, 1946.  R. A. PFUNTNER ET AL  2,405,050
MAGNETIC COMPASS DEVIATION COMPENSATOR
Filed March 2, 1945  2 Sheets-Sheet 2

Inventors:
Richard A. Pfuntner,
Eleanor D. Wilson,
by *Harry E. Dunham*
Their Attorney.

Patented July 30, 1946

2,405,050

UNITED STATES PATENT OFFICE 2,405,050

MAGNETIC COMPASS DEVIATION COMPENSATOR

Richard A. Pfuntner, Saugus, and Eleanor D. Wilson, Brookline, Mass., assignors to General Electric Company, a corporation of New York Application March 2, 1945, Serial No. 580,504

9 Claims. (Cl. 33—225)

The present invention relates generally to magnetic compasses, and more particularly to a new and improved deviation compensator used for compensating for the effect of stray magnetic fields in the vicinity of the compass.

Magnetic compasses of the so-called remote indicating type are now widely used on aircraft, these compasses having the advantage that the magnetic compass and its associated transmitter may be located in a wing or some remote part of the fuselage of the aircraft where the effects of local magnetic fields and disturbances are less severe, the remote receiver indicator being located in the control cabin or some other convenient location. Deviation compensators for compasses, including the remote indicating type, frequently are located adjacent the direction-sensitive element of the compass, the compensator usually comprising a number of small permanent magnets adjustably mounted so that the compensating auxiliary field produced thereby can be made to be equal and opposite to the field caused by the plane's permanent magnetism or other permanently magnetized bodies in the vicinity of the compass. Such deviation compensators require local adjustment and are subject to the disadvantage that remote compass transmitters are usually located in a small, cramped space so that frequently adjacent equipment or even part of the airplane structure has to be removed to render the deviation adjustment accessible.

An object of the present invention is to provide a new and improved deviation compensator for a magnetic compass.

Another object of the invention is to provide a deviation compensator that is remotely adjustable so that there is no need for having access to the remotely located compass.

A further object of the invention is to provide a remote controlled compass-deviation compensator which is relatively simple, inexpensive, and which can be applied to any compass or device used to detect the direction of the earth's magnetic field.

Further objects and advantages of my invention will become apparent as the following description proceeds.

According to the present invention deviation compensation is accomplished by the provision of an annular core of permeable magnetic material which is located in magnetic relation with the directional element of the compass. The core has coil means associated therewith having a single phase connection adapted to be connected to a source of alternating or periodically varying current, and, in addition, polyphase connections which are supplied with second harmonic currents from a remotely located compensator transmitter unit. The second harmonic currents flowing in the coil and the resulting second harmonic fluxes produced in the core cause unidirectional magnetic flux to flow across the diameter of the core. The transmitter is provided with magnetic means for varying the magnitude and polarity of the second harmonic currents supplied to the compensator core whereby the magnitude and direction of the unidirectional field produced across the diameter of the core may be adjusted to compensate, i. e., cancel out, effect of any stray magnetic field in the vicinity of the compass.

Figure 2:
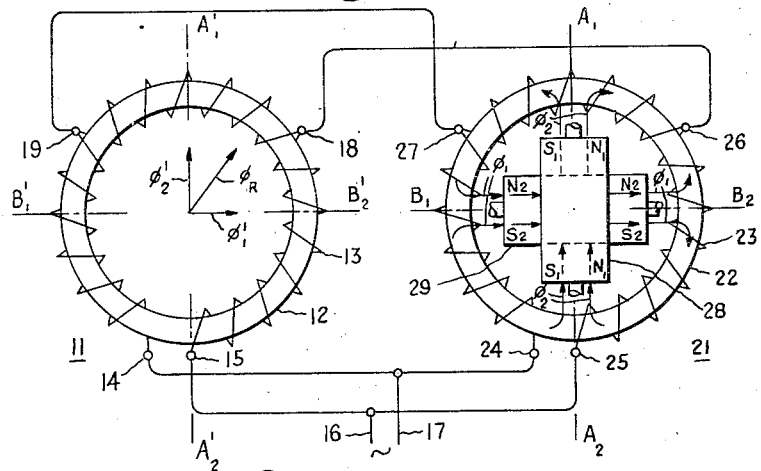
Figure 3:
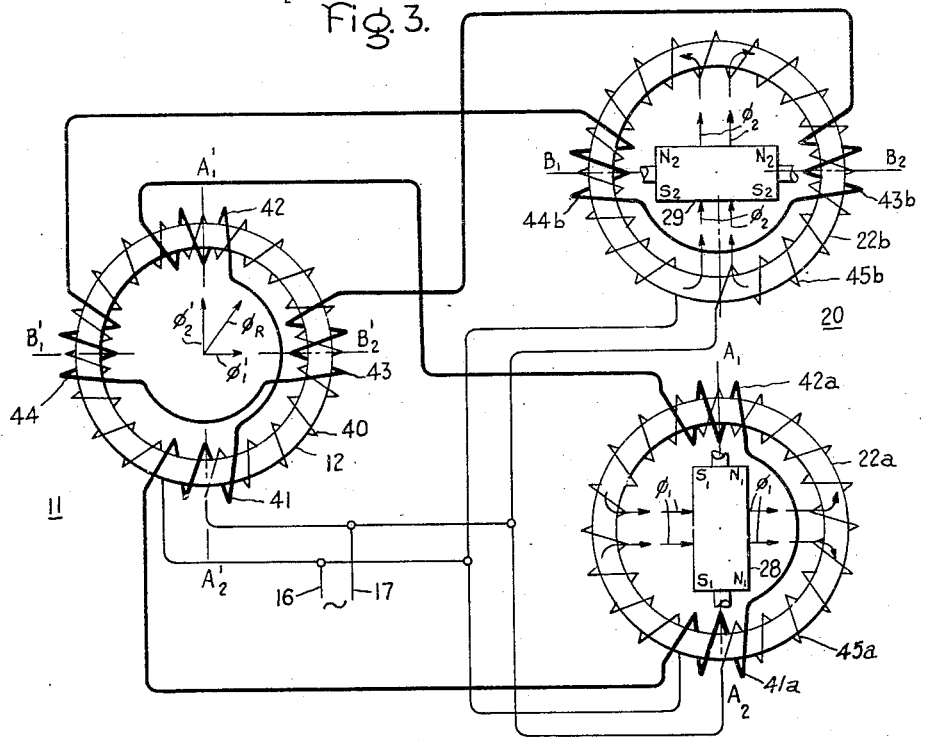

For a better and more complete understanding of the invention reference should now be made to the following detailed description and to the accompanying drawings in which Fig. 1 is a diagrammatic view, in perspective, of a remote indicating magnetic compass provided with a compensator and compensator transmitter unit forming the subject matter of the present invention, Fig. 2 is a schematic wiring diagram showing the manner in which the windings of the compensator and transmitter units shown in Fig. 1 are electrically interconnected, and Fig. 3 shows a modification in which the compensator carries separate windings for the second harmonic currents and the transmitter has two separate cores and associated windings for the production of second harmonic currents which are fed to the compensator.

Referring to Fig. 1 of the drawings, the deviation compensator forming the subject matter of the present invention is shown as being used in connection with a standard, remote-indicating, magnetic compass used on aircraft comprising a compass transmitter unit 1 and an indicator receiver 2, the two units being coupled together by means of an electric cable 32 which carries the necessary signal impulses for reproducing the compass indications of the transmitter 1 at the remotely located receiver indicator 2. The compass transmitter unit 1 may comprise a conventional compass element comprising a pair of permanent magnets 3 which are pendulously supported on a vertical post 4 by means of a jewelled bearing 5 so that the compass magnets 3 are free to swing in a horizontal plane and seek the magnetic meridian. Angular position of the compass magnet 3 in the transmitter unit is reproduced at the receiver indicator unit 2 by a well known second harmonic telemetering system comprising a transmitter ring 6 located beneath the compass magnet, the ring being electrically connected by the cable 32 to a similar ring 7 at the receiver indicator. The permanent magnet field from the compass magnet 3 which is produced across the diameter of the transmitter ring 6 causes a flow of second harmonic current between the transmitter receiver rings 6 and 7, these currents causing a unidirectional magnetic field to flow across the diameter of the receiver ring 7, the angular position of the field extending across the rings 6 and 7 remaining in correspondence. Mounted for rotation within the receiver ring 7 are a pair of permanent magnets 8 which are mechanically coupled to a compass card 9. The permanent magnets 8 tend to maintain themselves in alignment with the unidirectional magnetic field flowing across the diameter of ring 7 so that the compass card 9 reproduces the angular position of the compass magnet 3 relative to the aircraft on which the compass system is mounted, the cardinal characters on the compass card 9 being read against the stationary index 10. The remote indicating compass system thus far described is entirely conventional and forms no part of the present invention as the deviation compensator, which will now be described, is applicable to all types of magnetic compasses including both the pivoted magnet and induction types.

The deviation compensator, forming the subject matter of the present invention, comprises a compensator ring 11 which may be mounted, as shown, in the upper portion of the compass transmitter unit 1 so that it is in a position to magnetically influence the compass magnets 3. The ring 11 is mounted in a horizontal position so that the axis of the ring coincides with the axis of rotation of the compass magnet 3.

As shown in Fig. 2, the compensator ring 11 comprises a closed core 12 which is preferably, although not necessarily, annular in shape. The core is also preferably laminated and formed of a highly permeable magnetic material, such as, for example, magnetic material known to the trade as "Permalloy" or "Mumetal." The core 12 carries a uniformly distributed winding 13, the end connections of which are brought at adjacent points on the ring, the end points of the winding being numbered 14 and 15.

The coil connections 14 and 15, which may be termed a single phase connection, are connected to a source of alternating current supply, the supply leads being numbered 16 and 17.

The winding 13 is provided with tapped connections 18 and 19, the taps being spaced so that the connections 18 and 19 and the common connection 15 are located at three equally spaced points around the periphery of the coil, i. e., they are 120° apart, these connections being termed polyphase connections. Second harmonic currents supplied from a remotely located transmitter unit, indicated generally at 20, are introduced into the winding 13 through the polyphase connections 15, 18 and 19, and the second harmonic currents cause a unidirectional compensating magnetic field to flow across the diameter of the core 12, as will be more fully described.

The compensator transmitter unit 20 comprises a ring 21 which may be similar to the compensator ring 11, the two rings being electrically interconnected by electric connections indicated generally at 39. As shown in Fig. 2, the transmitter ring 21 comprises an annular core 22 of permeable magnetic material, the core carrying a uniformly distributed exciting winding 23, the end connections of which are brought out at points 24 and 25 to form single phase connections which are connected to the alternating current supply leads 16 and 17. The winding 23 is also provided with tapped connections 26 and 27 which are located so that the connections 26 and 27 and the common connection 25 are equally spaced around the periphery of the winding 23 to form symmetrical polyphase connections corresponding to the polyphase connections 15, 18 and 19 of the compensator winding 13. As shown, the corresponding polyphase connections of the compensator winding 13 and the transmitter winding 23 are electrically connected.

Associated with the core 22 of the transmitter unit are a pair of cylindrically shaped permanent magnets 28 and 29, the magnets being mounted adjacent the core on opposite sides thereof. The magnet 28 is mounted on a rotatable shaft 30 the axis of rotation of which coincides with the axis of the magnet cylinder and extends in the direction of the line A1, A2. The magnet 29 is mounted on a rotatable shaft 31, the axis of rotation of which coincides with the axis of the magnet cylinder and extends in the direction of the line B1, B2. As shown, the axes A1, A2 and B1, B2 are mutually perpendicular and lie in planes including mutually perpendicular diameters of the core 22.

The cylindrical magnets 28 and 29 are each magnetized across a diameter of the cylinder so that diametrically opposite points on the surface of the cylinder constitute north and south poles, as indicated. When the magnets 28 and 29 are rotated to the position shown, the magnet 28 will cause a unidirectional magnetic flux $\phi 1$ to flow across a diameter of the core 22 in the direction of axis B1, B2, and the magnet 29 will cause a unidirectional magnetic flux $\phi 2$ to flow across a diameter of the core 22 in the direction of the axes A2, A1. The magnetic fluxes $\phi 1$ and $\phi 2$ produced by the magnets 28 and 29 return to opposite poles of the magnets through the core 22, as indicated by the flux arrows and in this manner the fluxes link the winding 23.

The ampere turns of the windings 13 and 23 on the compensator and transmitter cores 12 and 21 are selected such that alternating current supplied from the supply lines 16 and 17 causes partial saturation of the cores 12 and 22. The partial saturation in the core 22 causes a periodic variation in the permeability of the core which, in turn, causes an accompanying periodic variation in the unidirectional fluxes $\phi 1$ and $\phi 2$ which link the winding 23. As the result of the periodic variation or pulsation of the fluxes $\phi 1$ and $\phi 2$, second harmonic currents and voltages are induced in the winding 23. Due to the symmetry of the polyphase interconnection between the windings 13 and 23 of the compensator and transmitter, corresponding second harmonic currents and voltages are induced in the winding 13 of the compensator. The second harmonic currents induced in the winding 13 of the compensator produce second harmonic fluxes which circulate around the core 12 and across diameters thereof in the same relative directions as the fluxes $\phi 1$ and $\phi 2$ circulate in the transmitter core 22. Second harmonic fluxes in the core 12 are alternating in nature, but due to the periodic saturation of the core 12 due to the flow of exciting current of fundamental frequency in the winding 13 a rectifying action takes place so that the magnetic fluxes flowing across the diameter of the core 12 are unidirectional in nature. Thus the unidirectional flux $\phi 1$ produced across the diameter of core 22 by the magnet 28 produces a corresponding unidirectional flux $\phi 1'$ flowing across the diametric axis B1', B2' of the compensator core. Similarly, the unidirectional magnetic flux $\phi 2$ produced by the permanent magnet 29 and flowing across the diametric axis A2, A1 of the transmitter core 22 produces a corresponding unidirectional flux $\phi 2'$ flowing across the diameter of the compensator core 12 in the direction of the diametric axes A2', A1'. The two fluxes $\phi 1'$ and $\phi 2'$ produced across the mutually perpendicular diameters combine to produce a resultant unidirectional flux $\phi_R$.

As shown in Fig. 1 of the drawings, suitable deviation adjustment knobs 33 and 34 are provided by means of which the permanent magnets 28 and 29 can be rotated about their respective axes A1, A2 and B1, B2, the knobs 33 and 34 being mechanically connected to the shafts 30 and 31 by shafts 35 and 36, and gears 37 and 38. By rotating the permanent magnets 28 and 29, the components of unidirectional flux produced thereby and flowing in the direction of the axes A1, A2 and B1, B2 may be adjusted with reference to both magnitude and direction. In this manner the magnitude and polarity of the second harmonic currents flowing from the compensator transmitter to the compensator, and consequently the magnitude and direction of the corresponding unidirectional fluxes $\phi 1'$ and $\phi 2'$ may be adjusted as desired. Thus, for example, if the magnet 28 is rotated 90° counterclockwise, as viewed from the top in Fig. 1, so that the north and south poles are brought into alignment with the axis C1 and C2 of the core 22, there will be no component of unidirectional flux flowing across the diameter of the core in the direction of the axes B1, B2, and consequently the flux $\phi 1'$ will be reduced to zero. If rotation of the magnet 28 is continued for 90 degrees more, the magnet poles will be reversed from the position shown in Fig. 1 and the flux $\phi 1$ will flow in the direction of the diameter B2, B1. This will cause a corresponding reversal in the flux $\phi 1'$ in the compensator core so that its direction will correspondingly be in the direction of the diameter B2', B1'. By rotating the magnet 28 to intermediate angular positions it will be apparent that the magnitude and direction of the unidirectional flux $\phi 1$ and $\phi 1'$ can be varied as desired. Similarly, by rotating magnet 29, the magnitude and direction of the unidirectional fluxes $\phi 2$ and $\phi 2'$ can also be adjusted as desired. Thus it will be apparent that by correlated adjustment obtained by rotating the adjusting knobs 33 and 34 and the permanent magnets 28 and 29, a resultant unidirectional flux $\phi_R$ flowing across the diameter of the compensator core 12 can be obtained having any desired magnitude and direction.

It is important to note that the only possible interference between the magnetic fields produced by the magnets 28 and 29 is in the direction of the axis C1, C2 of the core. Interference in this direction, however, is immaterial, since magnetic flux flowing in this direction does not circulate around the transmitter core 22 and therefore does not result in the generation of second harmonics currents in the winding 23. There is no interference between the unidirectional magnetic fluxes $\phi 1$ and $\phi 2$ which extend in the direction of the axes B1, B2 and A1, A2, and which are effective in producing second harmonic currents in the windings 23 and 13 since they are mutually perpendicular. Therefore, it is possible to adjust the magnetic flux $\phi 1$ and $\phi 1'$ without in any way affecting the mutually perpendicular magnetic fluxes $\phi 2$ and $\phi 2'$, and vice versa. This feature is very desirable since it facilitates the deviation compensation adjustment which will now be described.

With the above understanding of the invention both as to the structure and organization of the elements and the manner in which the compensating component magnetic fields of varying strength at right angles to each other may be produced across the diameter of the compensator core 12, the manner in which the device functions to compensate for effect of a stray magnetic field upon the reading of the compass will readily be understood. The compensator ring 11 is oriented so that the axis A1', A2' is parallel to the longitudinal axis of the aircraft on which the compass system is installed. In adjusting the compensating device, the aircraft is headed by means of a transit or otherwise so that its fore and aft axis, and the axis A1', A2', are exactly parallel to the north-south meridian of the earth's magnetic field which is represented by the vector 46 in Fig. 1. The presence of a stray magnetic field, such for example as might be caused by the engine or some other magnetic part of the aircraft becoming magnetized, would exert a turning moment on the compass magnets 3 so that the compass card 9 will not give the indication that it would otherwise give in the absence of such a disturbing magnetic field. Assuming that this disturbing magnetic field is of such magnitude and direction that its horizontal component is represented by the vector B in Fig. 1, this horizontal component of the disturbing field may itself be resolved into two components at right angles to each other. These components are component $B_s$ parallel to the direction of the earth's magnetic field, and also to the fore and aft axis of the aircraft, and a component $B_a$ at right angles to the direction of the earth's magnetic field and lying exactly athwartship. Since the fore and aft axis of the aircraft is headed north and south, the component $B_s$ exerts no influence, i. e., turning moment, on the compass magnets 3, since, as pointed out above, this component is parallel to the direction of the earth's magnetic field. The component $B_a$, however, which is at right angles to the direction of the earth's field, will cause the compass magnets 3 to be deflected from the true north-south position which they would otherwise normally occupy in the earth's field so that the indication of the remote compass card 9 is erroneous. This erroneous indication may be corrected by rotating the adjusting knob 33 so as to rotate the permanent magnet 28 until a compensating component of magnetic field exactly equal to and opposite in direction to the component $B_a$ is produced by the compensator ring in the direction of the diameter B1', B2'. When this point is reached, the north index line on the compass card 9 will be exactly opposite the stationary reference index 10.

In order to effect the athwartship compensation, the aircraft is headed east and west by means of a transit or otherwise. The component $B_s$ of the stray magnetism that was formerly parallel to the direction of the earth's field will now be at right angles thereto, and consequently will exert an influence or turning moment on the compass magnets 3 such as to deflect them from the positions that they would ordinarily occupy in the earth's field with the result that the compass card 9 will not indicate true east or west, as the case may be. The effect of the component $B_s$ may be balanced out, however, by rotating the adjusting knob 34 and the permanent magnet 29 until an auxiliary component field exactly equal to and in opposite direction to that of the component $B_s$ is produced by the compensator ring 11 in a direction of the axis A1', A2'. This adjustment may be made by rotating the knob 34 and observing when the stationary index 10 lies in coincidence with the east or west index line on the compass card 9, as the case may be.

The deviation transmitter unit 20 may be conveniently located adjacent the remote indicating compass indicator 2 and the above-described deviation compensation adjustment can be made without need for access to the compass transmitter unit 1 which may be located in a wing tip or at some remote location in the fuselage.

It is not necessary that the compensator ring 11 be mounted above the compass magnets 3 as shown in Fig. 1 of the drawings, the only requirement being that the ring 11 be mounted in horizontal position and that the axis of the ring coincide approximately with the axis of rotation of the compass magnets. Thus, if it is desired to reduce the overall height of the transmitter unit 1, the ring 11 may be located below the compass magnets and, if the physical dimensions of the compass transmitter ring 5 are sufficient, the compensator ring may even be mounted within the transmitter ring.

It is to be noted that one of the advantages of this system of deviation compensation over a system where direct current excited electromagnets are used is the fact that the strength of the compensating field produced by the compensator ring 11 is insensitive to changes in supply voltage over a considerable range. The reason for this is the fact that the cores 12 and 22 operate in the saturated region of the magnetization curve.

In Fig. 3 of the drawings, there is shown a modified arrangement in which separate windings are provided for carrying the second harmonic currents which are effective in producing unidirectional magnetic fields across the diameter of the compensator ring 11. Also in this modification two separate cores are used in the transmitter so that the permanent magnets 28 and 29 can be physically separated if desired. In this modification the compensator core 12 is provided with a uniformly distributed exciting winding 40 and two sets or pairs of grouped polyphase windings 41, 42, 43 and 44. The polyphase windings which carry the second harmonic currents are shown in heavier lines in the drawings to distinguish them from the exciting windings. The exciting winding 40 is connected to the alternating current supply lines 16 and 17 as shown. The diametrically opposite polyphase windings 41 and 42 are connected in series opposition, as are the diametrically opposite polyphase windings 43 and 44, in order to obtain a cancellation of the voltages of fundamental or supply frequency induced therein caused by a circulation of pulsating magnetic flux of supply frequency induced by the exciting winding 40. As shown, the polyphase windings 41, 42, 43 and 44 are grouped so that they lie adjacent the diametric axes A1', A2' and B1', B2'.

In this modification the transmitter unit 20 is provided with two separate cores 22a and 22b formed of magnetically permeable material. The core 22a is provided with a uniformly distributed exciting winding 45a which is electrically connected to the alternating current supply lines 16, 17, as shown. The core is also provided with two diametrically opposite polyphase windings 41a and 42a which are located adjacent the diametric axis A1, A2, the polyphase windings being connected in series opposition and also connected to corresponding windings 41 and 42 on the compensator core. The cylindrical permanent magnet 28 extends across the diameter of the core 22a and is mounted for rotation about the diametric axis A1, A2. In a similar manner, the transmitter core 22b is provided with a uniformly distributed exciting winding 45b which is connected to the alternating current supply lines 16, 17, as shown. The core 22b is also provided with a set of polyphase windings 43b and 44b which are located adjacent the diametric axis B1, B2, the windings being connected in series opposition and also connected to corresponding windings 43 and 44 on the compensator core. The cylindrical permanent magnet 29 extends across the diameter of the core 22b and is mounted for rotation about the diametric axis B1, B2.

The permanent magnet 28 produces a unidirectional magnetic flux $\phi 1$ which circulates in the core 22a so as to link the polyphase windings 41a and 42a, causing second harmonic currents to be induced therein, these currents also flowing in the corresponding windings 41 and 42 of the compensator. This causes a corresponding unidirectional flux $\phi 1'$ to flow across the diameter of the compensator core in a direction of the axis B1', B2'. As in the case of the embodiment shown in Fig. 2, by rotating the permanent magnet 28 the magnitude and polarity of the second harmonic current flow can be adjusted to obtain the desired magnitude and direction of the component $\phi 1'$ of the compensating field.

Similarly, the permanent magnet 29 produces a unidirectional flux $\phi 2$ which flows through the core 22b so as to link the polyphase windings 43b and 44b, thereby inducing second harmonic currents in these windings which also flow through corresponding windings 43 and 44 on the compensator core. This produces a unidirectional magnetic field $\phi 2'$ across the diameter of the compensator core in a direction of the axis A2', A1'. By rotating the permanent magnet 29, the polarity and magnitude of the second harmonic currents, and consequently the magnitude and direction of the component $\phi 2'$ of the unidirectional compensating field can be adjusted as desired. Thus, by a correlated adjustment of the permanent magnets 28 and 29 the resultant compensating unidirectional magnetic field $\phi R$ can be made equal and opposite to the horizontal component of the stray magnetic field whereby the desired deviation compensation adjustment is obtained in the same manner as previously described in connection with the embodiment of the invention shown in Fig. 2.

The arrangement shown in Fig. 3 has the advantage that the magnets 28 and 29 may be physically spaced from each other so as to avoid any possible mutual demagnetizing action of the magnets due to interaction of their fields. Also, with this arrangement the magnets may be poled at opposite ends of the cylinder rather than across the diameter, the magnets being mounted to rotate about the axis of the associated core rather than the axis of the cylinder in a manner similar to the relation of the compass magnets 3 relative to the transmitter ring 6. Such a construction is more efficient magnetically in that a greater ratio of length of the magnetic material along the magnetic axis to area perpendicular to the axis may be obtained.

While we have shown and described particular embodiments of our invention, it will occur to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. A compass compensating device comprising a closed core of permeable magnetic material located in magnetic relation with said compass, means for producing a periodically varying magnetic flux in said core, means for inducing second harmonic magnetic fluxes in said core at spaced points around the periphery thereof, whereby to produce a compensating unidirectional magnetic field across said core, and means for varying the polarity and magnitude of said second harmonic fluxes whereby to vary the magnitude and direction of said unidirectional compensating magnetic field.

2. A deviation compensator for a magnetic compass comprising a closed core of permeable magnetic material located in magnetic relation with said compass, coil means associated with said core, said coil means having a single phase connection and polyphase connections, means for supplying said single phase connection with a periodically varying current, means for supplying second harmonic currents to said polyphase connections whereby a unidirectional magnetic field is produced across said core, and means for varying the polarity and magnitude of said second harmonic current whereby to vary the magnitude and direction of said unidirectional field.

3. A compensating device for a magnetic compass comprising an annular core of permeable magnetic material located in magnetic relation with said compass, coil means on said core having a single phase connection and polyphase connections, a source of periodically varying current connected to said single phase connection to produce a periodically varying flux in said core, transmitter means for supplying second harmonic currents to said polyphase connections to produce a compensating unidirectional magnetic field across said core, a first adjusting means associated with said transmitter means for varying the polarity and magnitude of said second harmonic currents supplied to said polyphase connections so as to vary the magnitude and direction of the component of said unidirectional field in the direction of the first diameter of said core, a second adjusting means associated with said transmitter means for varying the polarity and magnitude of said second harmonic current supplied to said polyphase connection so as to vary the magnitude and direction of the component of the unidirectional magnetic field in a direction of a second diameter of said core at right angles to said first diameter whereby the magnitude and direction of said compensating unidirectional magnetic field may be varied by the correlated adjustment of said first and second adjusting means.

4. A remote controlled deviation compensator for a magnetic compass comprising a first annular core of permeable magnetic material located in magnetic relation with said compass, a second annular core of permeable magnetic material located remote from said compass, said cores having similar coil means associated therewith, the coil means associated with each core having a single phase connection and polyphase connections, the corresponding polyphase connections of said cores being electrically interconnected, means for supplying a periodically varying current to the single phase connections of said cores, means for producing a unidirectional magnetic field across a first diameter of said second core whereby a unidirectional field is produced across a corresponding diameter of said first core, means for producing a unidirectional magnetic field across a second diameter of said second core at right angles to said first diameter whereby unidirectional field is produced across corresponding diameter of said first core, and means for varying the magnitude and polarity of the unidirectional magnetic fields in the direction of said first and second diameters of said second core whereby to vary the magnitude and direction of the resulting unidirectional field produced across the diameter of said first core.

5. A remote controlled deviation compensator for a magnetic compass comprising a first annular core of permeable magnetic material located in magnetic relation with said compass, a second annular core of permeable magnetic material located remote from said compass, said cores having similar coil means associated therewith, the coil means associated with each core having a single phase connection and polyphase connections, the corresponding polyphase connections of said cores being electrically interconnected, means for supplying a periodically varying current to the single phase connections of said cores, a first elongated cylindrical permanent magnet associated with said second core and extending in the direction of a first diameter of said second core, a second elongated cylindrical permanent magnet also associated with said second core and extending in the direction of a second diameter of said second core at right angles to said first diameter, said cylindrical permanent magnets being magnetized across a diameter of the cylinder so that mutually perpendicular unidirectional magnetic fields are produced across said second core in the direction of said first and second diameters whereby corresponding unidirectional magnetic fields are produced across corresponding diameters of said first core, and means for separately rotating said first and second magnets about their cylinder axes so as to vary the magnitude and polarity of the unidirectional fields produced thereby in a direction of said first and second diameters whereby to vary the magnitude and direction of the resultant unidirectional field produced across the diameter of said first core.

6. A compensating device for a magnetic compass comprising a circular core of permeable magnetic material located in magnetic relation with said compass, said core having an exciting winding connected to a source of periodically varying current and two sets of polyphase windings, said polyphase windings being so arranged that when one of said sets of polyphase windings is energized with a second harmonic current a unidirectional magnetic flux is produced across a first diameter of said core and when the other set of said polyphase windings is connected to a source of second harmonic current a unidirectional magnetic flux is produced across a second diameter of said core extending at right angles to said first diameter, means for supplying second harmonic currents to said two sets of polyphase windings, and means for separately varying the polarity and magnitude of the second harmonic current supplied to each of said polyphase windings whereby to vary the magnitude and direction of the resultant unidirectional flux produced across the diameter of said core.

7. A compensating device for a magnetic compass comprising a circular core of permeable magnetic material located in magnetic relation with said compass, coil means in inductive relation with said core, said coil means having a pair of single phase connections and two pairs of polyphase connections, means for supplying a periodically varying current to said single phase connections, said polyphase connections being arranged so that when a source of second harmonic current is connected to one of said pairs of polyphase connections a unidirectional magnetic flux is produced across a first diameter of said core and when a source of second harmonic current is connected to the other of said pairs of polyphase connections a unidirectional magnetic flux is produced across a second diameter of said core extending at right angles to said first diameter, means for supplying second harmonic currents to said pairs of polyphase connections, and means for separately varying the polarity and magnitude of the second harmonic currents supplied to each of said pairs of polyphase connections whereby to vary the magnitude and direction of the resultant unidirectional flux produced across the diameter of said core.

8. A remote controlled deviation compensator for a magnetic compass comprising an annular core of permeable magnetic material located in magnetic relation with said compass, a distributed exciting winding and two sets of polyphase windings on said core, the polyphase windings of each set being diametrically opposite and connected in series opposition and the diametric axes passing through each set of polyphase windings being mutually perpendicular, a first transmitter for supplying second harmonic current to one of said sets of polyphase windings, a second transmitter for supplying second harmonic current to the other of said sets of polyphase windings, said first and second transmitters each having adjusting means associated therewith for varying the polarity and magnitude of the second harmonic currents supplied to said sets of polyphase windings whereby to vary the magnitude and direction of the right angle components of the resulting unidirectional magnetic field produced across the diameter of said first core.

9. An electromagnetic device adapted to be used as a transmitter of second harmonic currents comprising a core of permeable magnetic material, coil means on said core having a single phase connection and polyphase connections, means for connecting said single phase connection to a source of alternating current, a first elongated cylindrical permanent magnet associated with said core and extending in a direction of a first diameter of said core, a second elongated cylindrical permanent magnet also associated with said core and extending in a direction of a second diameter of said core at right angles to said first diameter, said cylindrical permanent magnets being magnetized across the diameter of the cylinder so that mutually perpendicular, unidirectional magnetic fields are produced across said core in a direction of said first and second diameters, and means for rotating said first and second magnets about their cylinder axes so as to vary the magnitude and polarity of the unidirectional fields produced thereby in the direction of said first and second diameters whereby to vary the magnitude and polarity of the second harmonic voltages developed across said polyphase connections.

RICHARD A. PFUNTNER.
ELEANOR D. WILSON.